(12) United States Patent
Stuntebeck et al.

(10) Patent No.: US 9,813,241 B2
(45) Date of Patent: *Nov. 7, 2017

(54) ENCRYPTED FILE STORAGE

(71) Applicant: VMware, Inc., Palo Alto, CA (US)

(72) Inventors: Erich Stuntebeck, Marietta, GA (US); Ramani Panchapakesan, Bangalore (IN); Akshay Laxminarayan, Bangalore (IN); Kumar Ashish, Bangalore (IN)

(73) Assignee: AirWatch LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/439,375

(22) Filed: Feb. 22, 2017

(65) Prior Publication Data
US 2017/0163419 A1    Jun. 8, 2017

Related U.S. Application Data

(63) Continuation of application No. 15/055,847, filed on Feb. 29, 2016, now Pat. No. 9,582,672, which is a continuation of application No. 14/727,909, filed on Jun. 2, 2015, now Pat. No. 9,292,699.

(51) Int. Cl.
| | | |
|---|---|---|
| *H04L 29/06* | (2006.01) | |
| *H04L 9/08* | (2006.01) | |
| *H04L 9/14* | (2006.01) | |
| *G06F 21/62* | (2013.01) | |
| *G06F 17/30* | (2006.01) | |
| *H04L 29/08* | (2006.01) | |
| *G06F 9/445* | (2006.01) | |

(52) U.S. Cl.
CPC ...... *H04L 9/0894* (2013.01); *G06F 17/30091* (2013.01); *G06F 17/30194* (2013.01); *G06F 21/6218* (2013.01); *H04L 9/14* (2013.01); *H04L 63/0428* (2013.01); *H04L 67/1097* (2013.01); *G06F 8/61* (2013.01); *H04L 67/303* (2013.01)

(58) Field of Classification Search
CPC ..................................................... G06F 21/602
USPC ......................................................... 713/165
See application file for complete search history.

(56) References Cited

U.S. PATENT DOCUMENTS 7,739,301 B2 *  6/2010  Bojinov ............ G06F 17/30067
                                                    707/782
8,806,207 B2 *  8/2014  Nussbaum ............ G06F 21/606
                                                    380/278

* cited by examiner

*Primary Examiner* — Longbit Chai

(57) ABSTRACT

Various systems facilitate encrypted file storage. A client device may generate an encrypted version of a file. The client device may obtain at least one reference to at least one storage location for the encrypted version of the file. The client device may cause the encrypted version of the file to be store at the at least one storage location using the at least one reference to the at least one storage location.

20 Claims, 5 Drawing Sheets

ENCRYPTED FILE STORAGE

CROSS-REFERENCE TO RELATED APPLICATIONS

This application is a continuation of and claims the benefit of U.S. patent application Ser. No. 15/055,847, entitled "ENCRYPTED FILE STORAGE," filed Feb. 29, 2016, which is a continuation of U.S. patent application Ser. No. 14/727,909, entitled "ENCRYPTED FILE STORAGE," and filed Jun. 2, 2015, both of which are hereby incorporated by reference in their entireties.

BACKGROUND

Some data storage providers operate data centers where data storage is allocated for several users. A user may store and retrieve data, such as images, videos, and word processing documents, using one or more client devices that communicate with a data storage system over a network. The data storage provider may charge a fee to the user based on the amount of data being stored by the data storage system and/or the number of times that the user accesses the stored data.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
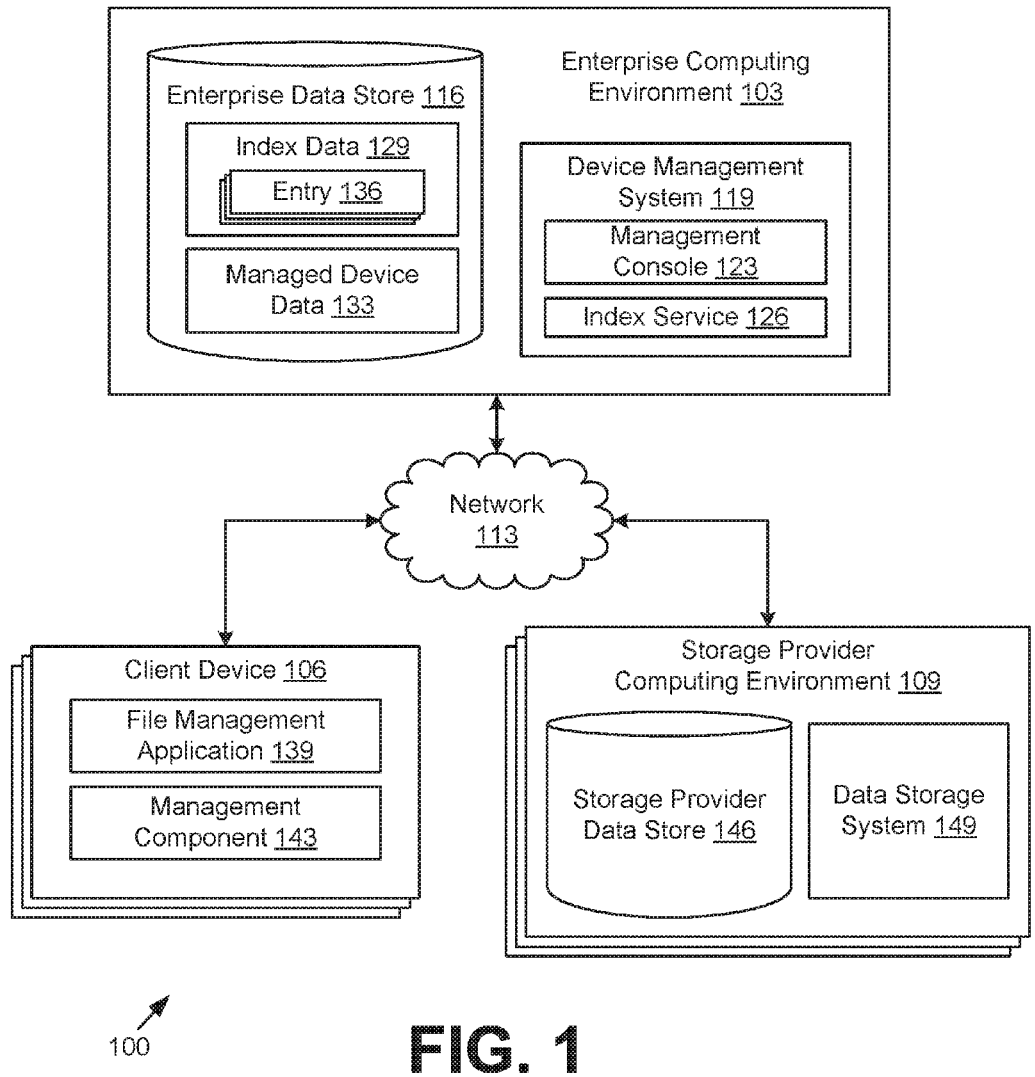
FIG. 1 is a drawing of a networked environment according to various embodiments.

The present disclosure relates to storing and retrieving encrypted versions of files using data storage systems that are accessible to client devices over a network. In one non-limiting example, a file management application executing on a client device transmits to an index service a request to store a file at a remote data store. The data store may be provided by an entity that is not controlled by the user of the client device and/or the operator of the device management system (e.g., a public cloud storage provider). If the device management system authorizes the requested storage, the client device may obtain a reference to a storage location for the file, and the reference may be stored by the index service for later use. The reference to the storage location may, for example, indicate a particular path of a file system hierarchy where the file management application should cause an encrypted version of the file to be stored. The client device may encrypt the file and transmit the encryption key to the device management system for later use. Additionally, the client device may transfer the encrypted version of the file to the data storage system and cause the encrypted version of the file to be stored at the location indicated by the received reference.

In one example, the index server is trusted by the client device, while the remote data store is untrusted. In this regard, the index server is operated in accordance with security protocols that the entity and/or operator of the device management system approves, while the entity and/or operator of the device management system may have little to no control over the security protocols used by the remote data store. The index server may be hosted by an organization to which a user of the client device belongs to, or by a trusted partner. The remote data store may be offered by a public cloud data storage provider, wherein data for the user of the client device is stored along with data belonging to other users and organizations. In addition, an administrator at the public cloud data storage provider will generally have access to the systems where data for the user of the client device is stored.

Later, the client device may transmit to the index service a request to retrieve the encrypted version of the file. In response, the index service may provide the client device with a reference to the storage location of the encrypted version of the file in the remote data store as well as the corresponding encryption key. The client device may then communicate with the data storage system and use the reference to the storage location to retrieve the encrypted version of the file. Thereafter, the client device may decrypt the encrypted version of the file using the encryption key. Thus, embodiments of the present disclosure may provide a mechanism for a client device to store files at a remote data store that is operated by an untrusted third party while providing the index service a way to monitor and restrict access to the stored files.

With reference to FIG. 1, shown is a networked environment 100 according to various embodiments. The networked environment 100 shown in FIG. 1 includes an enterprise computing environment 103, a client device 106, a storage provider computing environment 109, and potentially other components, which are in data communication with each other over a network 113. The network 113 includes, for example, the Internet, one or more intranets, extranets, wide area networks (WANs), local area networks (LANs), wired networks, wireless networks, other suitable networks, or any combination of two or more such networks. Such networks may comprise satellite networks, cable networks, Ethernet networks, telephony networks, and/or other types of networks.

The enterprise computing environment 103 may comprise, for example, a server computer or any other system providing computing capabilities. Alternatively, the enterprise computing environment 103 may employ multiple computing devices that may be arranged, for example, in one or more server banks, computer banks, or other arrangements. Such computing devices may be located in a single installation or may be distributed among many different geographical locations. For example, the enterprise computing environment 103 may include multiple computing devices that together form a hosted computing resource, a grid computing resource, and/or any other distributed computing arrangement. In some cases, the enterprise computing environment 103 may operate as at least a portion of an elastic computing resource where the allotted capacity of processing, network, storage, or other computing-related resources may vary over time. The enterprise computing environment 103 may also include or be operated as one or more virtualized computer instances that are executed in order to perform the functionality that is described herein. Generally, the enterprise computing environment 103 is operated in accordance with particular security protocols such that it is considered a trusted computing environment.

Various systems may be executed in the enterprise computing environment 103. Also, various data is stored in an enterprise data store 116 that is accessible to the enterprise computing environment 103. The enterprise data store 116 shown in FIG. 1 may be representative of multiple enterprise data stores 116. The data stored in the enterprise data store 116 is associated with the operation of the various components described below.

A device management system 119 and/or other systems may be executed in the enterprise computing environment 103. The device management system 119 may be executed to manage and/or oversee the operation of multiple client devices 106. In some embodiments, an enterprise, such as one or more companies or other organizations, may operate the device management system 119 to oversee and/or manage the operation of the client devices 106 of its employees, contractors, customers, etc. Accordingly, the device management system 119 is considered a trusted system.

The device management system 119 may include a management console 123, an index service 126, and/or other components. The management console 123 may facilitate administration of devices of an enterprise by administrators via the device management system 119. For example, the management console 123 may generate one or more user interfaces that are rendered on a display device to facilitate interaction with the device management system 119. Such user interfaces may facilitate an administrator's inputting of commands or other information for the device management system 119. Additionally, the user interfaces may include presentations of statistics or other information regarding the client devices 106 that are managed by the device management system 119.

The index service 126 may obtain and store various information regarding files that are associated with one or more client devices 106 and/or the device management system 119. For example, the index service 126 may track file activity and store information regarding the locations, encryption keys, permissions (e.g., access rights), the file version, access history, and/or other information of files. Because the index service 126 is operated in conjunction with the device management system 119, the index service 126 is considered a trusted file index server.

The data stored in the enterprise data store 116 may include index data 129, managed device data 133, and/or other information. The index data 129 may include an entry 136 for each file for which the index service 126 obtains data. In some embodiments, an entry 136 may include data that represents, for example, a unique identifier, the location, an encryption key, permissions, the file version, access history, and/or other information for a particular file.

The managed device data 133 may include information regarding the client devices 106 that are managed and/or controlled by the device management system 119. The managed device data 133 for a particular client device 106 may include, for example, the identification of a user assigned to the client device 106, the identification of applications that are installed in the client device 106, historical data regarding the operation of the client device 106, and/or other information.

In addition, the managed device data 133 for a particular client device 106 may include one or more device profiles. A device profile may comprise a set of one or more compliance rules that may be specified by the device management system 119. Each compliance rule may specify one or more conditions that must be satisfied for a client device 106 to be deemed compliant with the compliance rule. As a non-limiting example, a compliance rule may specify that particular applications are prohibited from being installed on a client device 106. As another non-limiting example, a compliance rule may specify that a lock screen is required to be generated when the client device 106 is "awoken" from a low power (e.g., "sleep") state and that a passcode is required for a user to unlock the lock screen. Additionally, one or more compliance rules may be based on time, geographical location, and/or other predefined conditions. When the compliance rules for a particular device profile are satisfied, the device management system 119 may deem the corresponding client device 106 as being compliant with the device policy.

The client device 106 is representative of multiple client devices 106 that may be coupled to the network 113. The client device 106 may comprise, for example, a processor-based system such as a computer system. Such a computer system may be embodied in the form of a desktop computer, a laptop computer, a personal digital assistant, a mobile phone (e.g., a "smartphone"), a set-top box, a music player, a web pad, a tablet computer system, a game console, an electronic book reader, or any other device with like capability. The client device 106 may include a display as well as one or more input devices, such as a mouse, touch pad, etc., that facilitates a user input or other types of data input into the client device 106.

The client device 106 may be configured to execute a file management application 139, a management component 143, and/or other components. The file management application 139 may comprise, for example, one or more programs that access, manage, edit, and/or perform other functions with respect to files. As non-limiting examples, a file may include an image, a video, a word processing document, a spreadsheet, etc. In some embodiments, the file management application 139 may be regarded as being a "content locker," because the file management application 139 may cause access to one or more of the files to be restricted. The file management application 139 may generate one or more user interfaces that facilitate a user of the client device 106 being presented with the information that is represented in files. For example, the file management application 139 may render files, such as images, videos, etc. In addition, one or more user interfaces for the file management application 139 may facilitate a user editing the content of a file, such as a word processing document, spreadsheet, image, etc. In addition, one or more user interfaces for the file management application 139 may facilitate a user causing a file to be provided to other client devices 106, the device management system 119, or other systems.

The management component 143 may be executed in the client device 106 to monitor and/or manage at least a portion of the data, applications, hardware components, etc., for the client device 106. The management component 143 may also identify whether the client device 106 is operating in accordance with the one or more compliance rules for one or more device profiles that have been assigned to the client device 106. In some embodiments, the management component 143 may function as a device management service that operates as a portion of an operating system for the client device 106. In other embodiments, the management component 143 may function as a device management agent that operates in the application layer of the client device 106 and that monitors at least some of the activity being performed in the client device 106. In other embodiments, the management component 143 may comprise an application wrapper that interfaces with a software component to facilitate overseeing, monitoring, and/or managing one or more resources of the client device 106. Alternatively, the management component 143 may be a portion of an application that was developed, for example, using a Software Development Kit (SDK) that facilitates the inclusion of functionality within the application that monitors and/or manages at least a portion of the resources for the client device 106.

The management component 143 may be executed by the client device 106 automatically upon startup of the client device 106. Additionally, the management component 143 may run as a background process in the client device 106. Accordingly, the management component 143 may execute without user intervention in some embodiments. Additionally, the management component 143 may communicate with the device management system 119 in order to facilitate the device management system 119 managing the client device 106. For example, the management component 143 may obtain compliance rules from the device management system 119, and the management component 143 may determine whether the client device 106 is operating in accordance with those compliance rules. In another example, the management component 143 transmits data that indicates the status of settings for the client device 106, and the device management system 119 uses this data to determine whether the client device 106 is operating in accordance with compliance rules. If it is determined that the client device 106 is not in compliance with one or more compliance rules, the management component 143 or the device management system 119 causes a remedial action to be performed. Examples of remedial actions include, notifying a user of the device or an administrator of the device management system 119, causing device settings to be changed so that the client device 106 becomes compliant with the compliance rules, and wiping data in the client device 106.

The storage provider computing environment 109 may comprise, for example, a server computer or any other system providing computing capabilities. Alternatively, the storage provider computing environment 109 may employ multiple computing devices that may be arranged, for example, in one or more server banks, computer banks, or other arrangements. Such computing devices may be located in a single installation or may be distributed among many different geographical locations. For example, the storage provider computing environment 109 may include multiple computing devices that together form a hosted computing resource, a grid computing resource, and/or any other distributed computing arrangement. In some cases, the storage provider computing environment 109 may operate as at least a portion of an elastic computing resource where the allotted capacity of processing, network, storage, or other computing-related resources may vary over time. The storage provider computing environment 109 may also include or be operated as one or more virtualized computer instances that are executed in order to perform the functionality that is described herein.

The storage provider computing environment 109 may be operated by an entity that is a third party relative to the user of the client device 106 and/or the entity that operates the enterprise computing environment 103. The storage provider may be a public cloud provider offering data storage to the public as a service for fee. In other words, the storage provider may provide data storage for multiple users and entities, including the users of the client devices 106 and/or the entity that operates the enterprise computing environment 103. A user of a client device 106 and/or the entity that operates the enterprise computing environment 103 may enroll in the data storage service. In one example, the storage provider computing environment 109 is untrusted by the entity that operates the enterprise computing environment 103. This is because it stores data for the user of the client device 106 along with data belonging to other users and organizations, and also because an administrator at the storage provider computing environment 109 will generally have access to the systems where data for the user of the client device 106 is stored.

Various systems may be executed in the storage provider computing environment 109. Also, various data is stored in a storage provider data store 146 that is accessible to the enterprise computing environment 103. The storage provider data store 146 shown in FIG. 1 may be representative of multiple storage provider data stores 146. The storage provider data store 146 may store files and/or other data for several users.

A data storage system 149 and/or other systems may be executed in the storage provider computing environment 109. The data storage system 149 may facilitate and manage the storage of data in the storage provider data store 146. For example, the data storage system 149 may provide an application protocol interface (API) and/or any other suitable interface that facilitates communication between the data storage system 149 and the client device 106 and/or device management system 119. In addition, the data storage system 149 may authenticate requests to store and/or retrieve data. Additionally, the data storage system 149 may perform load balancing processes to facilitate the transfer of data between the storage provider data store 146 and other components, for example.

Next, a description of examples of the operation of the various components in the networked environment 100 is provided. To begin, the user of the client device 106 and/or the entity that operates the enterprise computing environment 103 may enroll for data storage service to be provided by the storage provider computing environment 109. During the enrollment process, access credentials, such as a username and password, may be generated for the client device 106 and/or the device management system 119 to communicate with the data storage system 149. In some embodiments, the user of the client device 106 may enroll for a personal account with the data storage system 149, and the client device 106 may provide the device management system 119 with the access credentials for the data storage system 149 for later use. In alternative embodiments, the enterprise that operates the enterprise computing environment 103 may enroll for an enterprise account with the data storage system 149, and the device management system 119 may store the access credentials in the enterprise data store 116 for later use.

Later, the file management application 139 may be used to create a file, access a file, edit a file, and/or perform other functions with respect to a file. For example, the file management application 139 may be used to create a word processing document, access a video that is stored in the client device 106, and/or edit an image that is stored in the client device 106.

The file management application 139 may initiate the process of storing an encrypted version of a file in a storage provider data store 146 for various reasons. For example, in some embodiments, the file management application 139 may initiate the process in response to a request from the user of the client device 106 to "save" the file. In another embodiment, the process may be initiated in response to a user of the client device 106 requesting to "share" the file with another user. In alternative embodiments, a storage provider data store 146 may be the default storage used by the file management application 139, and the file management application 139 may initiate the process of storing an encrypted version of the file in a storage provider data store 146 automatically in response to the file being created or saved.

Upon determining that an encrypted version of a file is to be stored in a storage provider data store 146, the client device 106 may begin encrypting the file. In some embodiments, the encryption key and/or encryption algorithm used by the client device 106 may be specified by the index service 126. In an alternative embodiment, the client device 106 may transmit the file to the index service 126 for the encryption to be performed by the index service 126, instead of the client device 106 encrypting the file.

Once an encrypted version of the file has been generated, the file management application 139 may cause the client device 106 to obtain a reference to the storage location where the encrypted file is to be stored. Such a reference may indicate, for example, a path of a file system hierarchy where the file will be stored. The reference may comprise, for example, a string that represents a hypertext transfer protocol (HTTP) uniform resource locator (URL) or a HTTP secure (HTTPS) URL. The data storage system 149 in various embodiments may be operable to translate such a HTTP or HTTPS URL into information that represents a storage location for the storage provider data store 146.

In one embodiment, the client device 106 may communicate with the data storage system 149 to obtain the reference to the storage location. For example, the file management application 139 may communicate with the data storage system 149 using an API provided by the storage provider computing environment 109 and select a particular storage location among multiple storage locations. In an alternative embodiment, the file management application 139 may communicate with the data storage system 149 using an API, and the data storage system 149 may specify the storage location for the file, for example, after the file has been stored in the storage provider data store 146. In other embodiments, the index service 126 may communicate with the data storage system 149 to obtain a reference to a storage location, and the index service 126 may store the reference in the index data 129 and/or transmit the obtained reference to the client device 106.

After the encrypted file has been generated and the reference to the storage location has been obtained, the file management application 139 may cause the encrypted file to be stored at the location indicated by the reference. In one embodiment, the file management application 139 may communicate with the data storage system 149 using an API provided by the storage provider computing environment 109 and transfer the encrypted file to the data storage system 149. For example, the file management application 139 may transmit access credentials (e.g., a username and password), the reference to where the encrypted file should be stored (e.g., a string indicative of a path of a file system hierarchy), data that represents the encrypted file, and/or other information to the data storage system 149. In another embodiment, the index service 126 may communicate with the data storage system 149 and transfer the encrypted file to the data storage system 149.

When the data storage system 149 receives the encrypted file, the data storage system 149 may store the file in the storage provider data store 146 among other files for other users that have enrolled with the data storage service provided by the storage provider computing environment 109. Because the stored file is encrypted and the encryption key is unavailable to the data storage system 149, the content of the file may be unintelligible to the data storage system 149. In addition, if the storage provider computing environment 109 is accessed by an unauthorized device, the content of the file may be unintelligible to the unauthorized device. Thus, embodiments of the present disclosure may prevent files from being subjected to access that is not authorized by the device management system 119.

In addition, after the file has been encrypted, the client device 106 and/or the index service 126 may discard the encryption key so that the client device 106 and/or the device management system 119 may not be able to decrypt the file until the encryption key is obtained at a later time. For example, after the client device 106 has encrypted a file and transmitted the encryption key to the device management system 119, the client device 106 may discard the encryption key. By doing so, the client device 106 may be unable to decrypt the file until the index service 126 provides the client device 106 with the encryption key. In alternative embodiments, the index service 126 may discard the encryption key, and the client device 106 may provide the encryption key for the index service 126 at a later time for decryption.

For each file that the client device 106 causes to be stored at the storage provider data store 146, the index service 126 may create an entry 136 in the index data 129. Each entry 136 may include, for example, a unique identifier for the file, the encryption key, the encryption algorithm used for the file, metadata, permissions, the file version, access history, and/or other information. The index service 126 may use the collected index data 129 to facilitate restricted access to files that are associated with the device management system 119. In addition, the index service 126 may be used to track and monitor activity regarding these files.

The file management application 139 may also be used to retrieve an encrypted file that is stored in the storage provider data store 146. An encrypted file may be retrieved by the client device 106 for various reasons. For example, the retrieval of a file may be initiated in response to a user operating the file management application 139 or another application in the client device 106 requesting to "open" a file.

To begin the file retrieval process, the file management application 139 may cause the client device 106 to retrieve the reference to the storage location where a particular file is stored. For example, the client device 106 may transmit a request to the index service 126 for the reference to where a particular file is stored. For instance, such a request may include an identifier for the file, the identity of the client device 106 and/or user, data that indicates that the file management application 139 is requesting the reference to the storage location, and/or other information.

In response to the request, the index service 126 may authenticate the request, consult the index data 129, and identify the entry 136 that corresponds to the file. As previously discussed, the reference for the storage location of a file may be stored in the entry 136 that corresponds to the file. In some embodiments, the index service 126 may also consult the index data 129 to identify whether the entry 136 indicates that the client device 106 is authorized to retrieve the reference to the storage location of the file. If the client device 106 is authorized to retrieve the reference, the device management system 119 may transmit the reference to the client device 106.

After the client device 106 has obtained the reference to the storage location, the file management application 139 may communicate with the data storage system 149 and retrieve the encrypted file from the data storage system 149. In some embodiments, the file management application 139 may request the file by transmitting access credentials (e.g., a username and password), a file identifier, the reference to where the encrypted file is stored (e.g., a string indicative of a path of a file system hierarchy), and/or other information using an API provided by the data storage system 149. If the file is stored in a personal account of the data storage system 149, the access credentials used by the client device 106 may be the access credentials of the user of the client device 106. If the file is stored in an enterprise account, the device management system 119 may provide the client device 106 with enterprise access credentials for retrieving the file.

Upon receiving and authenticating the request, the data storage system 149 may identify and transfer the requested file to the client device 106. In other embodiments, the index service 126 may perform the functionality of retrieving the encrypted file from the storage provider data store 146 and may then transfer the retrieved file to the client device 106.

After the client device 106 has retrieved the encrypted file from the data storage system 149, the file management application 139 may cause the client device 106 to decrypt the file using the corresponding encryption key. In some embodiments, the encryption key may already be stored in storage that is local to the client device 106. In other embodiments, the file management application 139 may request the encryption key from the index service 126. In response to the request, the index service 126 may retrieve the encryption key from the corresponding entry 136 in the index data 129 and transmit the encryption key to the client device 106. In other embodiments, the client device 106 may provide the encrypted file to the index service 126 for the index service 126 to perform the decryption. Because it may be difficult for the client device 106 or other devices to decrypt the file without the encryption key, access to the content in the encrypted file may be restricted by virtue of the restricted access to the encryption key.

In some embodiments, a user of the client device 106 may "share" a file with another user of another client device 106. To do so, the client device 106 of the sharing user may request that the index service 126 modify the permissions in the entry 136 for the file to indicate that the user of the other client device 106 is permitted to retrieve the file, and the client device 106 of the other user may retrieve the file using one or more of the mechanisms that are described above. In one example, the client device 106 of a sharing user provides the identity of the file to the client device 106 of a colleague, and the colleague's client device 106 retrieves from the index service 126 the reference to the storage location for the file. After the colleague's client device 106 has obtained the reference to the storage location, the colleague's client device 106 communicates with the data storage system 149 and retrieves the encrypted file from the data storage system 149. The colleague's client device 106 also retrieves the corresponding encryption key from the index service 126, so that the encrypted file may be decrypted when the encrypted file has been obtained by the colleague's client device 106.

In some embodiments, prior to storing the file in the storage provider data store 146, the client device 106 may partition a file into multiple portions and then encrypt each portion of the file. As a non-limiting example, the file may be partitioned so that all even-numbered bytes are grouped into a first file portion and all even-numbered bytes are grouped into a second file portion. Each portion of the file may be encrypted using a respective encryption key and/or a respective encryption algorithm. As a non-limiting example, the first file portion may be encrypted using a first encryption key and a first encryption algorithm, and a second file portion may be encrypted using a second encryption key and a second encryption algorithm.

For embodiments in which the file is partitioned into multiple portions, the file management application 139 may also cause the client device 106 to obtain one or more references to one or more storage locations for the file. For example, the client device 106 may retrieve a first reference to a first storage location for a first portion of the file and a second reference to a second location for a second portion of the file. Using one or more of the mechanisms for storing an encrypted file that are discussed above, the client device 106 may cause the first encrypted portion of the file to be stored at the storage location indicated by the first reference, and the second encrypted portion of the file may be stored at the storage location indicated by the second reference. In some embodiments, the encrypted portions of a file may be stored in multiple storage provider data stores 146 that are provided by multiple storage provider computing environments 109. As an example, a first encrypted portion of a file may be stored in a storage provider data store 146 that is operated by a first organization and a second encrypted portion of a file may be stored in a storage provider data store 146 that is operated by a second organization. Storing encrypted portions of a file in storage provider data stores 146 that are operated by multiple organizations may further restrict unauthorized access to the file.

As discussed above, the index service 126 may track the storage and retrieval of the files that are represented in the index data 129. For example, the index service 126 may log the storage and/or retrieval of a file in the corresponding entries 136 for files in the index data 129. At various times, the index service 126 may communicate with the data storage system 149 and obtain the file activity history of one or more of the encrypted files that are associated with the index services 126. The index service 126 may compare the file activity history obtained from the data storage system 149 with the data stored in the entry 136 for the file and identify whether there are any inconsistencies between the sets of data. For example, if the file activity history from the data storage system 149 indicates that an encrypted file has been retrieved more times than the number of times logged by the index service 126, the index services 126 may conclude that the encrypted file has been subjected to an unauthorized access and take remedial action.

Figure 2:
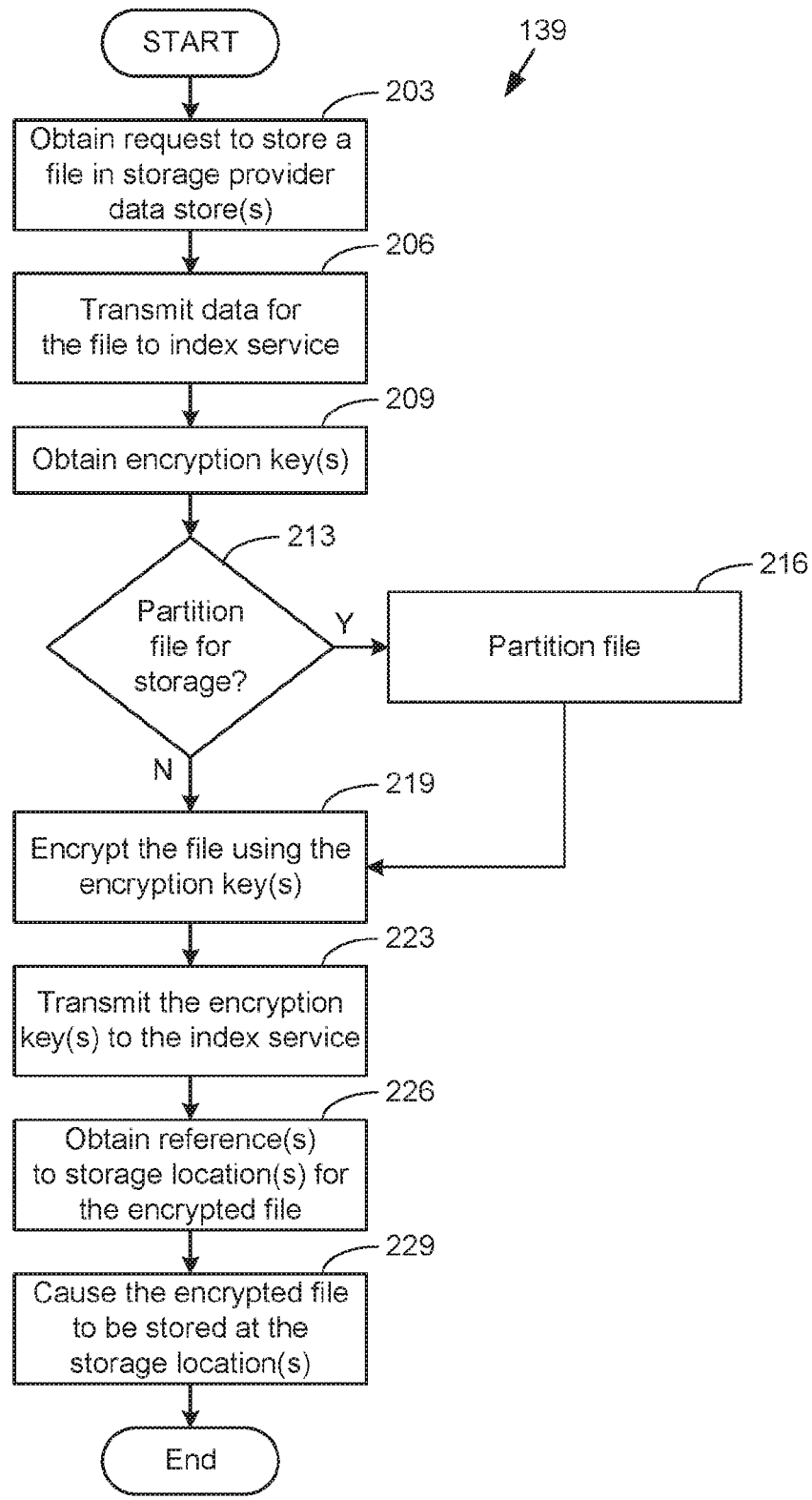
FIG. 2 is a flowchart illustrating an example of functionality implemented by a file management application in a client device of the networked environment of FIG. 1 according to various embodiments.

With reference to FIG. 2, shown is a flowchart that provides an example of a portion of the operation of the file management application 139 according to various embodiments. In particular, FIG. 2 provides an example of the file management application 139 causing an encrypted version of a file to be stored at one or more storage locations of one or more storage provider data stores 146 (FIG. 1). It is understood that the flowchart of FIG. 2 provides merely an example of the many different types of functional arrangements that may be employed to implement the operation of the portion of the operation of the file management application 139 as described herein. As an alternative, the flowchart of FIG. 2 may be viewed as depicting an example of elements of a method implemented in the client device 106 (FIG. 1) according to one or more embodiments.

Beginning with element 203, the file management application 139 obtains a request to store a file in one or more storage provider data stores 146. In some embodiments, the request may be initiated by a user of the client device 106 requesting to save a file. The file management application 139 then transmits data for the file to the index service 126, as shown at element 206. Such data may include, for example, a filename, file characteristics (e.g., file size), file permissions, metadata, and/or other information. This information may be stored in an entry 136 in the index data 129 by the index service 126. At element 209, the file management application 139 obtains one or more encryption keys for the file. In some embodiments, the encryption key may be obtained from the index service 126. In other embodiments, the encryption key may be obtained from local storage in the client device 106.

The file management application 139 then moves to element 213 and determines whether to partition the file for storage. In some embodiments, the file management application 139 may be instructed by the index service 126 to partition the file. As discussed above, the file may be partitioned in order to store separate encrypted portions in different storage locations. If the file management application 139 determines to partition the file, the file management application 139 performs the partitioning, as indicated at element 216. Otherwise, the file management application 139 moves to element 219.

As shown at element 219, the file is then encrypted using the one or more encryption keys that were obtained at element 209. In some embodiments, the index service 126 may also specify one or more encryption algorithms to use when generating the encrypted version of the file. At element 223, the file management application 139 causes the client device 106 to transmit the one or more encryption keys that were used to encrypt the file to the index service 126. The index service 126 may store the one or more encryption keys in the corresponding entry 136 in the index data 129 for the file.

As shown at element 226, the file management application 139 then obtains one or more references to the one or more storage locations where the encrypted version of the file is to be stored. In one embodiment, the client device 106 may communicate with one or more data storage systems 149 to obtain the one or more references using an API that is provided by the storage provider computing environment 109 (FIG. 1). In other embodiments, the index service 126 may obtain the one or more references from one or more data storage systems 149 using an API and then provide the one or more references to the client device 106.

At element 229, the file management application 139 causes the encrypted version of the file to be stored at the one or more storage locations indicated by the one or more references that were received at element 226. In one embodiment, the encrypted version of the file is stored by the file management application 139 transmitting access credentials (e.g., a username and password), the reference to where the encrypted file should be stored (e.g., a string indicative of a path of a file system hierarchy), data that represents the encrypted version of the file, and/or other information to the data storage system 149. In another embodiment, the client device 106 provides the encrypted version of the file to the index service 126, and the index service 126 communicates with the data storage system 149 to have the file stored. Thereafter, the process ends.

Figure 3:
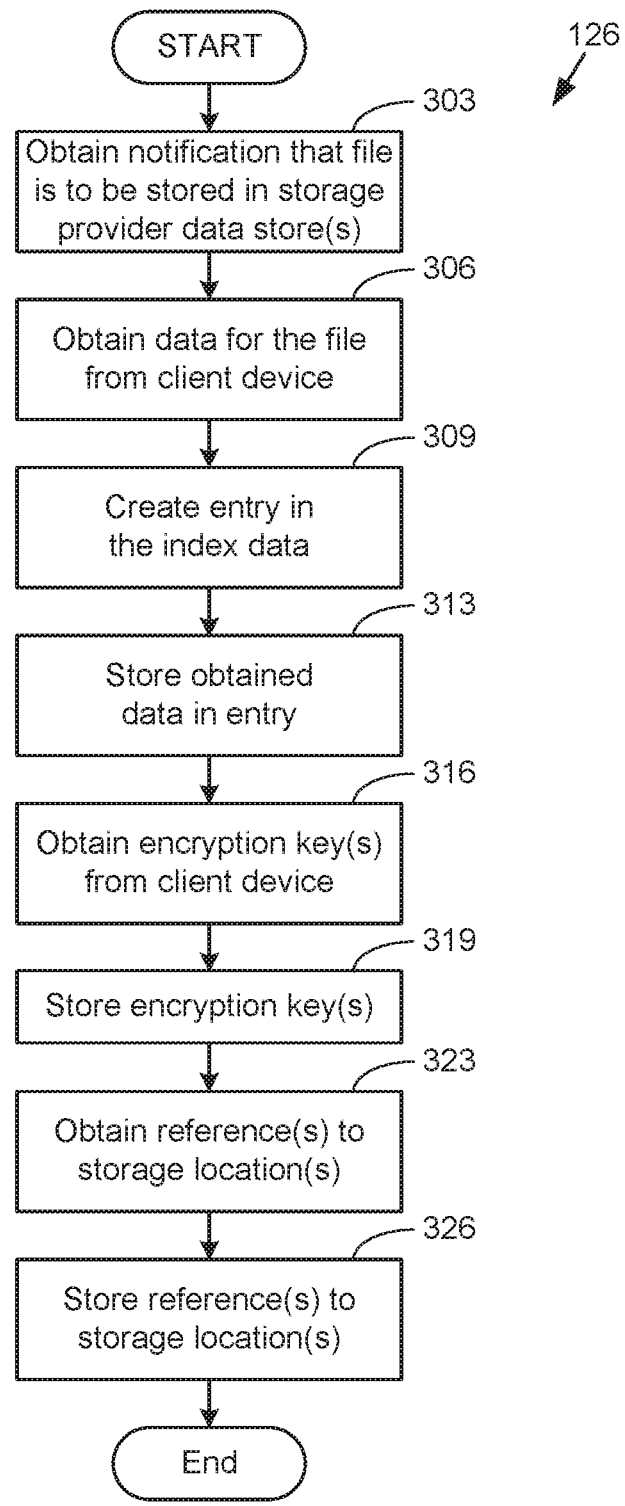
FIG. 3 is a flowchart illustrating an example of functionality implemented by an index service in an enterprise computing environment of FIG. 1 according to various embodiments.

With reference to FIG. 3, shown is a flowchart that provides an example of a portion of the operation of the index service 126 according to various embodiments. In particular, FIG. 3 provides an example of the index service 126 creating an entry 136 (FIG. 1) in the index data 129 for a file that a client device 106 (FIG. 1) is causing to be stored at a storage provider data store 146. It is understood that the flowchart of FIG. 3 provides merely an example of the many different types of functional arrangements that may be employed to implement the portion of the operation of the index service 126 as described herein. As an alternative, the flowchart of FIG. 3 may be viewed as depicting an example of elements of a method implemented in the device management system 119 (FIG. 1) according to one or more embodiments.

Beginning at element 303, the index service 126 obtains a notification that a file is to be stored in one or more storage provider data stores 146 (FIG. 1). At element 306, the index service 126 obtains data for the file from the client device 106. Such data may include, for example, an identifier for the file, metadata, permissions, the file version, and/or other information. At element 309, the index service 126 creates an entry 136 in the index data 129 for the file, and at element 313 the data that was obtained at element 306 is stored in the entry 136.

The index service 126 then moves to element 316 and obtains from the client device 106 one or more encryption keys that were used to encrypt the file. The index service 126 then stores the one or more encryption keys in the entry 136 in the index data 129, as shown at element 319.

At element 323, the index service 126 obtains one or more references to the one or more storage locations where the encrypted version of the file is or will be stored. In one embodiment, the index service 126 obtains the one or more references from one or more data storage systems 149. In an alternative embodiment, the index service 126 obtains the one or more references from the client device 106. As indicated at element 326, the index service 126 then stores the one or more references to the one or more storage locations in the entry 136 in the index data 129. Thereafter, the process ends.

Figure 4:
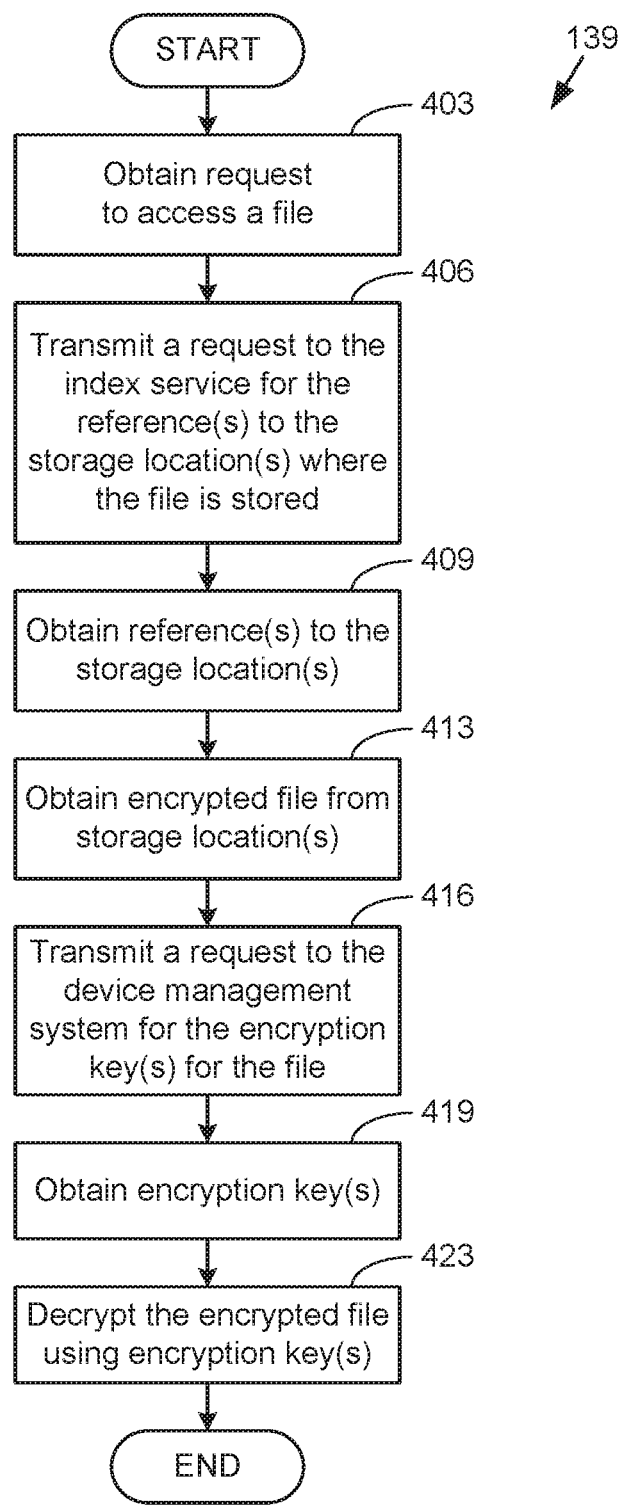
FIG. 4 is a flowchart illustrating another example of functionality implemented by the file management application in the client device of the networked environment of FIG. 1 according to various embodiments.

With reference to FIG. 4, shown is a flowchart that provides an example of a portion of the operation of the file management application 139 according to various embodiments. In particular, FIG. 4 provides an example of the file management application 139 obtaining an encrypted file from one or more storage provider data stores 146 and then decrypting the file. It is understood that the flowchart of FIG. 2 provides merely an example of the many different types of functional arrangements that may be employed to implement the portion of the operation of the file management application 139 as described herein. As an alternative, the flowchart of FIG. 4 may be viewed as depicting an example of elements of a method implemented in the client device 106 (FIG. 1) according to one or more embodiments.

Beginning at element 403, the file management application 139 causes the client device 106 to obtain a request to access a file. For example, the request may be obtained in response to a user of the client device 106 requesting to "open" a file. At element 406, the file management application 139 causes the client device 106 to transmit a request to the index service 126 (FIG. 1) for the one or more references to the one or more storage locations where the file is located. As previously discussed, the index service 126 may have this information stored in an entry 136 in the index data 129. The file management application 139 may then cause the client device 106 to obtain the reference, as shown at element 409.

As indicated at element 413, the file management application 139 then uses the obtained one or more references to obtain the encrypted version of the file from the one or more locations. In some embodiments, the file management application 139 may request the file by transmitting access credentials (e.g., a username and password), a file identifier, the reference to where the encrypted file is stored (e.g., a string indicative of a path of a file system hierarchy), and/or other information using an API provided by the data storage system 149. If the file is stored in a personal account of the data storage system 149, the access credentials used by the client device 106 may be the access credentials of the user of the client device 106. If the file is stored in an enterprise account, the device management system 119 may provide the client device 106 with enterprise access credentials for retrieving the file.

The file management application 139 then moves to element 416 and causes the client device 106 to transmit a request to the device management system 119 for the one or more encryption keys for the file. The file management application 139 obtains the one or more encryption keys, as shown at element 419, and then decrypts the file using the obtained encryption keys, as indicated at element 423. Thereafter, the process ends.

Figure 5:
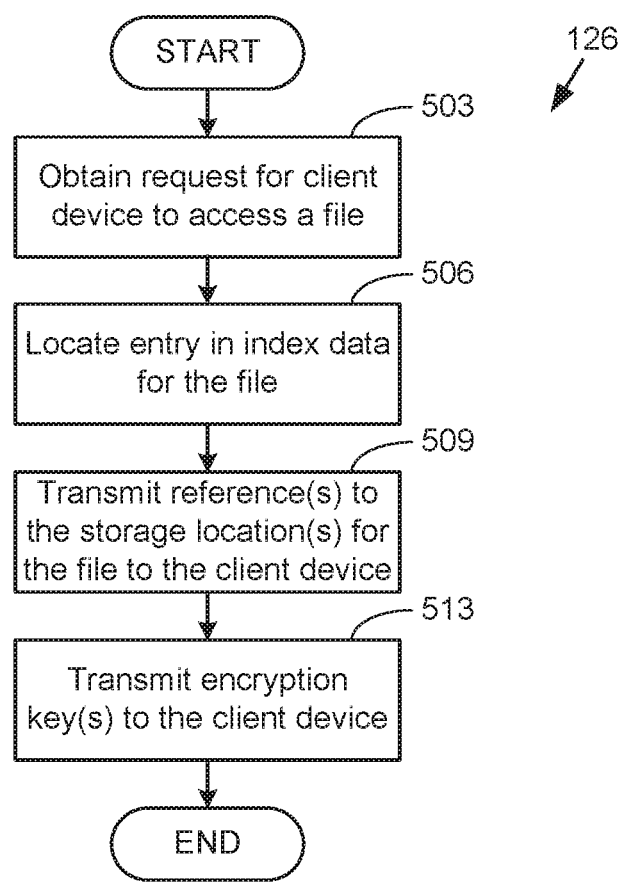
FIG. 5 is a flowchart illustrating another example of functionality implemented by the index service in the enterprise computing environment of FIG. 1 according to various embodiments.

With reference to FIG. 5, shown is a flowchart that provides an example of a portion of the operation of the index service 126 according to various embodiments. In particular, FIG. 5 provides an example of the index service 126 providing one or more encryption keys to a client device 106 (FIG. 1) in response to a request for the client device 106 to access a file. It is understood that the flowchart of FIG. 5 provides merely an example of the many different types of functional arrangements that may be employed to implement the portion of the operation of the index service 126 as described herein. As an alternative, the flowchart of FIG. 5 may be viewed as depicting an example of elements of a method implemented in the device management system 119 according to one or more embodiments.

Beginning at element 503, the index service 126 obtains a request for the client device 106 to access a file that is indexed in the index data 129. At element 506, the index service 126 locates the entry 136 in the index data 129 for the requested file. As discussed above, the entry 136 may include one or more references to one or more storage locations for the file. As shown at element 509, the index service 126 then transmits to the client device 106 the one or more references to the one or more storage locations for the file. In addition, the index service 126 transmits to the client device 106 the one or more encryption keys for the file. Thereafter, the process ends.

The flowcharts of FIGS. 2-5 show examples of the functionality and operation of implementations of components described herein. The components described herein can be embodied in hardware, software, or a combination of hardware and software. If embodied in software, each element may represent a module of code or a portion of code that comprises program instructions to implement the specified logical function(s). The program instructions may be embodied in the form of, for example, source code that comprises human-readable statements written in a programming language and/or machine code that comprises machine instructions recognizable by a suitable execution system, such as a processor in a computer system or other system. If embodied in hardware, each element may represent a circuit or a number of interconnected circuits that implement the specified logical function(s).

Although the flowcharts show a specific order of execution, it is understood that the order of execution may differ from that which is shown. For example, the order of execution of two or more elements may be switched relative to the order shown. Also, two or more elements shown in succession may be executed concurrently or with partial concurrence. Further, in some embodiments, one or more of the elements shown in the flowcharts may be skipped or omitted. In addition, any number of counters, state variables, warning semaphores, or messages might be added to the logical flow described herein, for purposes of enhanced utility, accounting, performance measurement, troubleshooting aid, etc. It is understood that all such variations are within the scope of the present disclosure.

The enterprise computing environment 103, the client device 106, the storage provider computing environment 109, and/or other components described herein may each include at least one processing circuit. Such a processing circuit may comprise, for example, one or more processors and one or more storage devices that are coupled to a local interface. The local interface may comprise, for example, a data bus with an accompanying address/control bus or any other suitable bus structure.

The one or more storage devices for a processing circuit may store data and/or components that are executable by the one or more processors of the processing circuit. For example, the device management system 119, the file management application 139, the data storage system 149, and/or other components may be stored in one or more storage devices and be executable by one or more processors. Also, a data store, such as the enterprise data store 116 and/or the storage provider data store 146, may be stored in the one or more storage devices.

The device management system 119, the file management application 139, the data storage system 149, and/or other components described herein may be embodied in the form of hardware, as software components that are executable by hardware, or as a combination of software and hardware. If embodied as hardware, the components described herein can be implemented as a circuit or state machine that employs any suitable hardware technology. Such hardware technology may include, for example but is not limited to, one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs) and complex programmable logic devices (CPLDs)), etc.

Also, one or more or more of the components described herein that comprise software or program instructions can be embodied in any non-transitory computer-readable medium for use by or in connection with an instruction execution system such as, for example, a processor in a computer system or other system. Such a computer-readable medium may contain, store, and/or maintain the software or program instructions for use by or in connection with the instruction execution system.

A computer-readable medium can comprise a physical media, such as, magnetic, optical, semiconductor, and/or other suitable media. Examples of a suitable computer-readable media include, but are not limited to, solid-state drives, magnetic drives, flash memory, etc. Further, any logic or component described herein may be implemented and structured in a variety of ways. For example, one or more components described may be implemented as modules or components of a single application. Further, one or more components described herein may be executed in one computing device or by using multiple computing devices. Additionally, it is understood that terms, such as "application," "service," "system," "engine," "module," and so on, may be interchangeable and are not intended to be limiting unless indicated otherwise.

It is emphasized that the above-described embodiments of the present disclosure are merely examples of implementations to set forth for a clear understanding of the principles of the disclosure. Many variations and modifications may be made to the above-described embodiments without departing substantially from the spirit and principles of the disclosure. All such modifications and variations are intended to be included herein within the scope of this disclosure.

The invention claimed is:

1. A method of storing files that are associated with a user account in at least one cloud data storage provider, comprising:
receiving, by an index server, a request to store a first file on behalf of a user associated with access credentials of the user account, the request being received from a client device executing a file management application that communicates with the index server;
identifying, by the index server, a first storage location of the first file associated with a cloud data storage provider that is different from the index server; and
providing, by the index server, the first storage location to the file management application, the first storage location specifying where to send an encrypted version of the first file, the encryption being based on a first key associated with the first storage location of the first file, the first key being different than the access credentials for the cloud data storage provider.

2. The method of claim 1, further comprising:
receiving, at the index server, a request from the client device to access the file;
determining the client device is authorized to access the file; and
providing the first storage location to the client device for retrieving the encrypted file for decryption by the file management application using the first key.

3. The method of claim 1, further comprising:
receiving the first key from the client device;
receiving a request from the client device to access the file; and
sending, to the client device, a version of the first key for decrypting the encrypted first file.

4. The method of claim 1, further comprising:
sending a management component to the client device for installation, wherein the management component causes the first key to be deleted from the client device after the encrypting.

5. The method of claim 1, further comprising:
receiving, by the index server, a request to store a second file;
identifying, by the index server, a second storage location unassociated with the cloud data storage provider; and
providing the second storage location to the file management application, wherein the file management application encrypts the second file based on a second key associated with the second storage location and sends the encrypted second file to second storage location using access credentials associated with the second storage location.

6. The method of claim 5, wherein the second storage location is at the index server.

7. The method of claim 1, wherein the wherein the file management application requests the first key for decrypting the encrypted file.

8. A system of storing files that are associated with a user account in at least one cloud data storage provider, comprising:
a non-transitory, computer-readable medium containing instructions; and
a processor device for an index server that executes the instructions to perform stages comprising:
receiving, by the index server, a request to store a first file on behalf of a user associated with access credentials of the user account, the request being received from a client device executing a file management application that communicates with the index server;
identifying a first storage location of the first file associated with a cloud data storage provider that is different from the index server; and
providing, by the index server, the first storage location to the file management application, the first storage location specifying where to send an encrypted version of the first file, the encryption being based on a first key associated with the first storage location of the first file, the first key being different than the access credentials for the cloud data storage provider.

9. The system of claim 8, the stages further comprising:
receiving, at the index server, a request from the client device to access the file;
determining the client device is authorized to access the file; and
providing the first storage location to the client device for retrieving the encrypted file for decryption by the file management application using the first key.

10. The system of claim 8, the stages further comprising:
receiving the first key from the client device;
receiving a request from the client device to access the file; and
sending, to the client device, a version of the first key for decrypting the encrypted first file.

11. The system of claim 8, the stages further comprising:
sending a management component to the client device for installation, wherein the management component causes the first key to be deleted from the client device after the encrypting.

12. The system of claim 8, the stages further comprising:
receiving, by the index server, a request to store a second file;
identifying, by the index server, a second storage location unassociated with the cloud data storage provider; and
providing the second storage location to the file management application, wherein the file management application encrypts the second file based on a second key associated with the second storage location and sends the encrypted second file to second storage location using access credentials associated with the second storage location.

13. The system of claim 12, wherein the second storage location is at the index server.

14. The system of claim 8, wherein the wherein the file management application requests the first key for decrypting the encrypted file.

15. A non-transitory, computer-readable medium containing instructions for storing files that are associated with a user account in at least one cloud data storage provider, the instructions being executed by a processor device to perform stages comprising:

receiving, by the index server, a request to store a first file on behalf of a user associated with access credentials of the user account, the request being received from a client device executing a file management application that communicates with the index server;

identifying a first storage location of the first file associated with a cloud data storage provider that is different from the index server; and providing, by the index server, the first storage location to the file management application, the first storage location specifying where to send an encrypted version of the first file, the encryption being based on a first key associated with the first storage location of the first file, the first key being different than the access credentials for the cloud data storage provider.

16. The non-transitory, computer-readable medium of claim 15, the stages further comprising:

receiving, at the index server, a request from the client device to access the file;

determining the client device is authorized to access the file; and providing the first storage location to the client device for retrieving the encrypted file for decryption by the file management application using the first key.

17. The non-transitory, computer-readable medium of claim 15, the stages further comprising:

receiving the first key from the client device;

receiving a request from the client device to access the file; and sending, to the client device, a version of the first key for decrypting the encrypted first file.

18. The non-transitory, computer-readable medium of claim 15, the stages further comprising:

sending a management component to the client device for installation, wherein the management component causes the first key to be deleted from the client device after the encrypting.

19. The non-transitory, computer-readable medium of claim 15, the stages further comprising:

receiving, by the index server, a request to store a second file;

identifying, by the index server, a second storage location unassociated with the cloud data storage provider; and providing the second storage location to the file management application, wherein the file management application encrypts the second file based on a second key associated with the second storage location and sends the encrypted second file to second storage location using access credentials associated with the second storage location.

20. The non-transitory, computer-readable medium of claim 19, wherein the second storage location is at the index server.

* * * * *